(12) United States Patent
Bacic et al.

(10) Patent No.: US 8,794,920 B2
(45) Date of Patent: Aug. 5, 2014

(54) CONTROLLING BLADE PITCH ANGLE

(75) Inventors: Marko Bacic, Abthorpe (GB); Jonathan E. Holt, Ilkeston (GB)

(73) Assignee: Rolls-Royce PLC, London (GB)

( * ) Notice: Subject to any disclaimer, the term of this patent is extended or adjusted under 35 U.S.C. 154(b) by 938 days.

(21) Appl. No.: 13/034,312

(22) Filed: Feb. 24, 2011

(65) Prior Publication Data

US 2011/0229319 A1 Sep. 22, 2011

(30) Foreign Application Priority Data

Mar. 18, 2010 (GB) .................................. 1004469.1

(51) Int. Cl.
*F01D 7/02* (2006.01)
*B64C 11/30* (2006.01)
*B64C 11/44* (2006.01)
*B64D 27/00* (2006.01)

(52) U.S. Cl.
CPC ............... *B64C 11/306* (2013.01); *B64C 11/44* (2013.01); *Y02T 50/66* (2013.01); *B64D 2027/005* (2013.01)
USPC ............................... 416/48; 416/61; 416/155

(58) Field of Classification Search
USPC .................. 416/44, 47, 48, 61, 155
See application file for complete search history.

(56) References Cited

U.S. PATENT DOCUMENTS

| 1,425,922 | A | | 8/1922 | Wesnigk | |
|---|---|---|---|---|---|
| 3,744,928 | A | * | 7/1973 | Hansen et al. | 416/31 |
| 4,005,835 | A | * | 2/1977 | Gerstine et al. | 244/17.13 |
| 4,772,179 | A | * | 9/1988 | Bennett et al. | 416/27 |
| 5,816,533 | A | * | 10/1998 | Krysinsky | 244/17.13 |
| 2009/0004008 | A1 | * | 1/2009 | Richards | 416/145 |
| 2011/0184593 | A1 | * | 7/2011 | Swope | 701/12 |

FOREIGN PATENT DOCUMENTS

| DE | 10 2008 003 632 A1 | 7/2009 |
|---|---|---|
| EP | 0 436 231 A2 | 7/1991 |
| EP | 1 719 910 A1 | 11/2006 |
| EP | 1 835 293 A1 | 9/2007 |
| EP | 2 163 474 A2 | 3/2010 |

OTHER PUBLICATIONS

British Search Report dated Jun. 29, 2010 in corresponding British Patent Application No. 1004469.1.
Oct. 16, 2013 European Search Report issued in European Patent Application No. 11155597.

* cited by examiner

*Primary Examiner* — Edward Look
*Assistant Examiner* — Woody A Lee, Jr.
(74) *Attorney, Agent, or Firm* — Oliff PLC

(57) ABSTRACT

A method and arrangement of controlling blade pitch angle of a set of rotor blades. The method comprises providing a target blade pitch angle to a controller mounted on the rotor; measuring the speed of rotation of the rotor using a rate gyro mounted on the rotor; calculating the blade pitch angle required to match the target blade pitch angle by summing the target blade pitch angle and the measured rotational speed; and actuating the blades to the calculated blade pitch angle.

10 Claims, 3 Drawing Sheets

CONTROLLING BLADE PITCH ANGLE

The present invention relates to a method of controlling blade pitch angle and an arrangement for the same. The invention finds particular utility for rotors having adjustable blade pitch angle especially, although not exclusively, for contra-rotating propeller gas turbine engines having two propeller stages with adjustable pitch blades.

A conventional gas turbine engine has a propulsive fan which creates two air flows. The first air flow is directed into the core engine, comprising compressors, a combustor, turbines and an exhaust nozzle. The second air flow is directed into an annular bypass duct, this air flow providing the majority of the propulsive force from the engine. It is known to have compressor stage rotor and stator blades with pitch that is adjusted depending on the engine speed and other parameters.

A further conventional gas turbine engine is a propeller gas turbine engine having a single propeller rotor stage. Typically the rotor blades have adjustable pitch angle to enable them to present the optimum angle of attack to the incoming air flow. A blade pitch controller, using a function of the engine controller, determines the target blade pitch angle given the engine conditions. The current speed of the rotor is ascertained indirectly using pulse counting via a magnetic reluctance speed probe and a phonic wheel connected to the rotor. The probe and controller are located in the stationary, engine frame of reference whilst the phonic wheel is located in the rotating, rotor frame of reference.

Modern propeller gas turbine engines can be arranged in pusher or puller configurations and have two propeller rotor stages that contra-rotate. The previously described speed probe and phonic wheel arrangement is adequate to measure the speed of the propeller stage nearer to the core of the engine, and thereby enable blade pitch actuation to occur. However, for the distal propeller stage, rear in a pusher configuration, there is no adjacent static frame of reference in which to locate the speed probe. Therefore the speed probe is located in the proximal, front rotor, rotating frame of reference and measures the speed of the rear rotor relative to the front rotor. This measured relative speed is then transmitted to the blade pitch controller, usually part of the engine controller, located on the engine body in the stationary frame of reference. The controller calculates any required change to the blade pitch angle and this is transmitted to an actuation mechanism to effect actuation of the blades of the rear propeller stage.

One disadvantage of this arrangement for a two stage propeller gas turbine engine is that measurements and control signals need to be transmitted between two rotating and the stationary frames of reference. Due to the contra-rotation of the rotating frames of reference, there are several interfaces for the signals to cross, meaning that wireless transmission is simplest. However, wireless signals are susceptible to interruption from electromagnetic interference including lightning strikes, and jamming by other signals, deliberately or incidentally. Such interruption of the signals causes the actuation system to become open-loop with unpredictable consequences, depending on which of the transmissions is interrupted and for how long. Where the propeller gas turbine engine is used to power an aircraft, such interruptions may cause critical failure of the pitch control mechanism, thereby unacceptably threatening the safety of the aircraft.

The present invention seeks to provide a method of and arrangement for controlling blade pitch actuation that seeks to address the aforementioned problems.

Accordingly the present invention provides a method of controlling blade pitch angle of a set of rotor blades, comprising: providing a target blade pitch angle to a controller mounted on the rotor; measuring the speed of rotation of the rotor using a rate gyro mounted on the rotor; calculating the blade pitch angle required to match the target blade pitch angle by summing the target blade pitch angle and the measured rotational speed; and actuating the blades to the calculated blade pitch angle.

Advantageously, this method places the feedback loop within the rotating frame of reference so that it is not necessary to pass the rotation speed measurement across the interface from the rotating to the stationary frame of reference in order to calculate the required blade pitch angle.

The method may further comprise measuring vibration of the rate gyro using a vibration transducer. The method may further comprise reducing vibration by applying a filter, comprising at least one of the group comprising a low pass filter, a notch filter or a fast Fourier transform. This allows cross-coupled vibration to be removed from the measured speed.

The method may further comprise applying a gain to the calculated blade pitch angle before actuating the blades.

The present invention also provides a rotor blade pitch angle control arrangement for a rotor, the rotor comprising: a rate gyro mounted on the rotor hub to provide the speed of rotation of the rotor; a blade pitch angle controller arranged to receive an input comprising the target blade pitch angle, and arranged to output a control signal; and an actuation mechanism arranged to actuate the blades to a pitch angle based on the control signal.

The blade pitch angle controller may be mounted on the rotor hub. Advantageously, the rate gyro, controller and actuation mechanism are all located in the rotating frame of reference so that the feedback signal does not have to cross the interface from the rotating to the static frame of reference.

The arrangement may further comprise a vibration transducer coupled to the rate gyro so that cross-coupled vibrations can be identified and reduced or eliminated.

The present invention also provides a propeller gas turbine engine comprising an arrangement as described. There may be two stages of propeller rotor blades, the actuation mechanism arranged to actuate the blades of the distal stage from the engine core. Advantageously, the control signals do not need to cross the rotating-rotating interface from the distal to the closer rotor stage, nor the rotating-static interface from the closer rotor stage to the static parts of the engine.

The present invention will be more fully described by way of example with reference to the accompanying drawings, in which.

Figure 1:
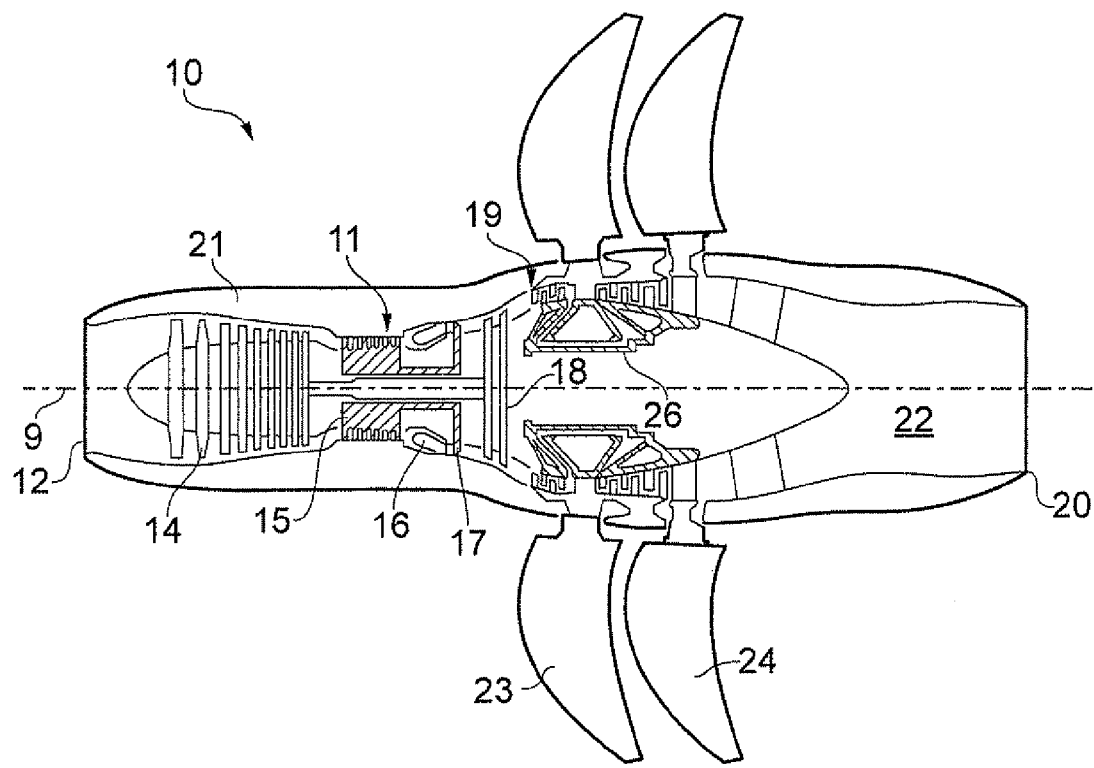
FIG. 1 is a sectional side view of a gas turbine engine having contra-rotating propeller stages.

Referring to FIG. 1, a twin-spooled, contra-rotating propeller gas turbine engine is generally indicated at 10 and has a principal rotational axis 9. The engine 10 comprises a core engine 11 having, in axial flow series, an air intake 12, an intermediate pressure compressor 14, a high-pressure compressor 15, combustion equipment 16, a high-pressure turbine 17, an intermediate pressure turbine 18, a free power (or low-pressure) turbine 19 and a core exhaust nozzle 20. A nacelle 21 generally surrounds the core engine 11 and defines the intake 12 and nozzle 20 and a core exhaust duct 22. The engine 10 also comprises two contra-rotating propeller stages 23, 24 attached to and driven by the free power turbine 19 via shaft 26.

The gas turbine engine 10 works in a conventional manner so that air entering the intake 12 is accelerated and compressed by the intermediate pressure compressor 14 and directed into the high-pressure compressor 15 where further compression takes place. The compressed air exhausted from the high-pressure compressor 15 is directed into the combustion equipment 16 where it is mixed with fuel and the mixture combusted. The resultant hot combustion products then expand through, and thereby drive the high-pressure, intermediate pressure and free power turbines 17, 18, 19 before being exhausted through the nozzle 20 to provide some propulsive thrust. The high-pressure, intermediate pressure and free power turbines 17, 18, 19 respectively drive the high and intermediate pressure compressors 15, 14 and the propeller stages 23, 24 by suitable interconnecting shafts. The propellers 23, 24 normally provide the majority of the propulsive thrust. In the embodiments herein described the propeller stages 23, 24 rotate in opposite senses so that one rotates clockwise and the other anti-clockwise around the engine's rotational axis 9.

Figure 2:
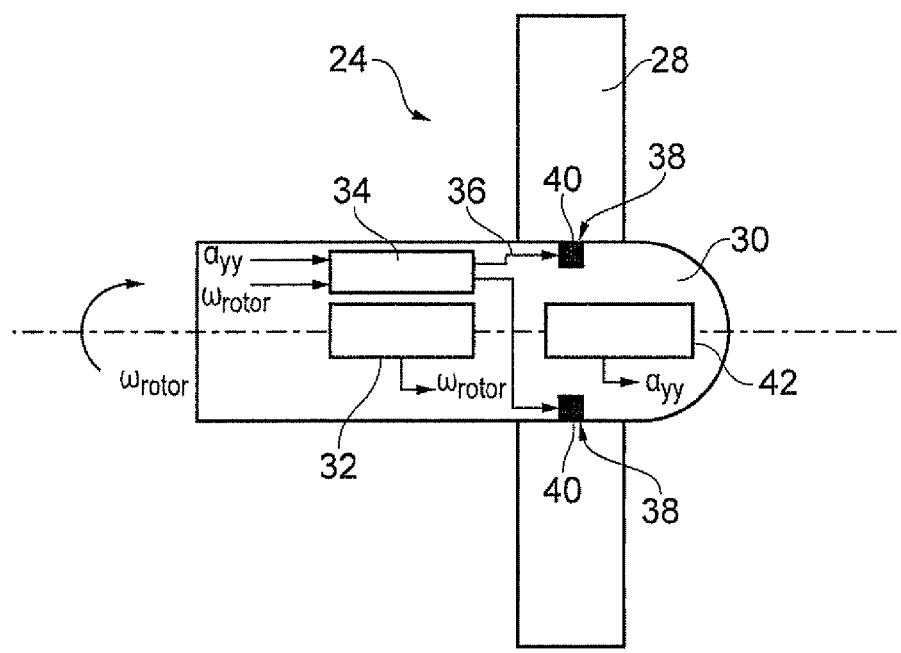
FIG. 2 is a schematic side view of a blade pitch control arrangement according to the present invention.
Figure 3:
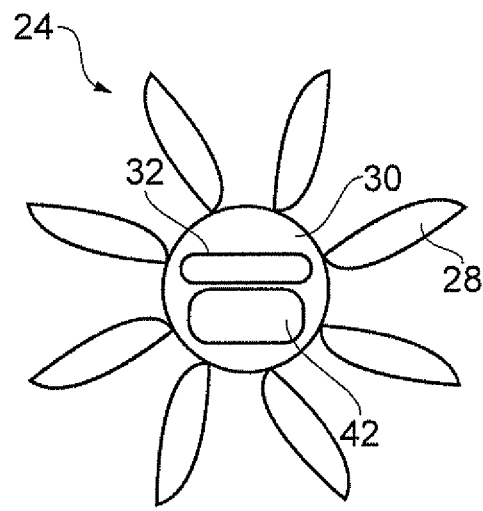
FIG. 3 is a schematic front view of the control arrangement shown in FIG. 2.

An exemplary embodiment of the present invention is shown in FIG. 2 and FIG. 3, which illustrate the rear propeller stage 24. The propeller stage 24 comprises a plurality of rotor blades 28 annularly arrayed around a rotor hub 30. Although eight rotor blades 28 are illustrated in FIG. 3 this is not indicative of the number to be provided for the engine 10, which will depend on the design requirements and constraints of the whole engine 10. Mounted to the rotor hub 30 is a rate gyro 32 that outputs the angular speed of rotation $\omega_{rotor}$ of the rear propeller stage 24. Thus the rate gyro 32 replaces the prior art arrangement comprising a phonic wheel and speed probe thereby obviating the former need for static structure proximal the rear propeller stage 24 upon which to mount the speed probe.

A controller 34 is also mounted to the rotor hub 30. The controller 34 serves to control the pitch angle of the sets of rotor blades 28 of the front and rear propeller stages 23, 24. In preferred embodiments the blade pitch control function is conducted by the controller 34 and other engine functions are controlled separately by an engine electronic controller (EEC 62, FIG. 5) in the stationary frame of reference. The controller 34 is arranged to receive an input from the rate gyro 32 comprising the rotational speed $\omega_{rotor}$. Additionally, the controller 34 receives an input comprising the target blade pitch angle from the EEC as will be described in greater detail with respect to FIG. 5. The controller 34 is arranged to output a control signal 36.

An actuation mechanism 38, comprising at least one blade pitch actuator 40, is also provided on the rotor hub 30. Each actuator 40 may be coupled to one rotor blade 28, to a plurality of rotor blades 28 or to the whole set of rotor blades 28 forming the rear propeller stage 24. The actuation mechanism 40 receives the control signal 36 from the controller 34 and actuates the rotor blades 28 to a different blade pitch angle in response.

The rate gyro 32 may experience significant vibration due to its location mounted on the rotating rotor hub 30. Depending on the frequencies of vibration experienced, the vibration may cross couple into the rotation speed measurement, $\omega_{rotor}$, and thereby skew the measurement. For this reason, there may also be an optional vibration transducer 42 mounted on the rotor hub 30 that outputs the acceleration in the radial y-direction, $a_{yy}$, perpendicular to the rotational axis. The acceleration $a_{yy}$ is provided to the controller 34 and is processed with the rotational speed measurement $\omega_{rotor}$ to adjust for vibration.

Figure 4:
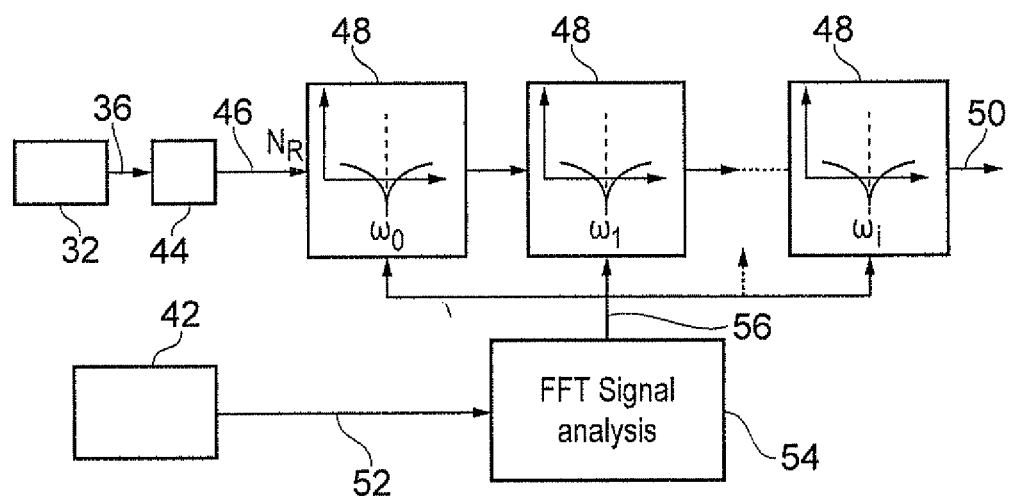
FIG. 4 is a filtering arrangement for use in conjunction with the control arrangement of the present invention.

Alternatively, the rotation speed measurement $\omega_{rotor}$ is processed as shown schematically in FIG. 4. The rate gyro 32 outputs the control signal 36 to a low pass filter 44, which attenuates high frequency parts of the control signal 36 that are generally associated with noise. The low pass filter 44 outputs a partially processed control signal 46 which is passed through a series of notch filters 48. The notch filters 48 may be software implemented. The output from the final notch filter 48 of the series is a processed control signal 50. Each notch filter 48 acts to attenuate a specific frequency or small range of frequencies that correspond to a specific vibration frequency or range of frequencies. The required number of notch filters 48 will therefore be determined by the particular application of the present invention. In order to determine the vibration frequencies to filter out of the control signal 36, the vibration transducer 42 outputs a vibration frequencies signal 52 to a signal analyser 54 that performs a fast Fourier transform (FFT) on the vibration frequencies signal 52. The output signal 56 from the signal analyser 54 comprises each frequency $\omega_n$ or small range of frequencies that corresponds to a mode of vibration. The output signal 56 is used to define the frequency or range of frequencies of each notch filter 48.

Figure 5:
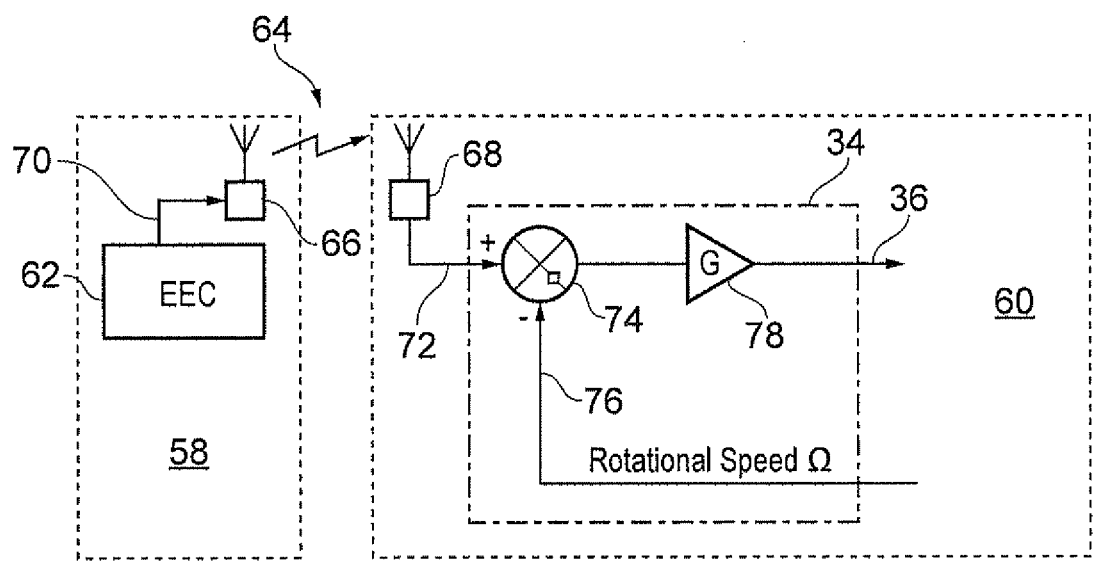
FIG. 5 is a schematic illustration of the components of the control arrangement according to the present invention.

FIG. 5 shows the control arrangement of the present invention. The static frame of reference 58 comprises the main parts of the gas turbine engine 10, in particular the EEC 62, the core engine 11 and the nacelle 21. The rotating frame of reference 60 is rotating relative to the static frame of reference 58. In the exemplary embodiment, the rear propeller stage 24 is in the rotating frame of reference 60. In the case of a contra-rotating propeller gas turbine engine 10, each propeller rotor stage 23, 24 is in a separate rotating frame of reference, the frames of reference each rotating relative to the other and to the static frame of reference 58.

A transmission system 64 is arranged to transmit signals from the EEC 62 across the interface between the static 58 and rotating 60 frames of reference. The transmission system 64 is composed of a transmitter 66 in the static frame of reference 58 and a receiver 68 in the rotating frame of reference 60. The transmitter 66 is coupled to the EEC 62. A reference signal 70 comprising the target blade pitch angle 72 is calculated in the EEC 62 and passed to the transmitter 66 via suitable wiring or otherwise as understood in the art. The reference signal 70 is transmitted through the transmission system 64 to the receiver 68. The transmission may be wireless. Alternatively, the transmission system 64 may comprise any other method known to the skilled reader and useable to transmit the reference signal 70 across the static-rotating interface.

The receiver 68 is coupled to the controller 34 so that the target blade pitch angle 72 is provided to the controller 34 by the receiver 68. The controller comprises several sub-components or functions. Thus more specifically, the target blade pitch angle 72 is provided from the receiver 68 to a first input of a summer 74 which forms part of the controller 34. The summer 74 has a second, negative input 76 comprising the rotational speed $\omega_{rotor}$ of the rear propeller stage 24. In order to receive this second input 76, the summer 74 is coupled to the rate gyro 32. The summer 74 subtracts the rotational speed $\omega_{rotor}$ from the target blade pitch angle 72, and outputs the result to a gain function 78 that also forms part of the controller 34. The gain function 78 is the final part of the controller 34. It applies a gain G to the interim result it receives and outputs the control signal 36 to the actuation mechanism 38.

This arrangement is advantageous for many reasons. The controller 34 may comprise fail-safe provisions so that in the event that the transmission system 64 malfunctions (through transmission failure or data corruption), the controller 34 can continue to calculate the desired blade pitch angle and to output the control signal 36 to the actuation mechanism 38. The fail-safe provision may take the form of a single fail-safe target blade pitch angle that can be substituted for the target blade pitch angle 72 provided by the EEC 62 in designated circumstances. Alternatively, the fail-safe provision may take the form of a fail-safe target blade pitch schedule that takes account of the engine cycle and resultant expected pitch requirements.

Although the present invention has been described for gas turbine engine applications, particularly for aircraft applications, it has utility for other applications. In particular, it can be applied to any variable pitch turbine or propeller where the pitch of the rotor blades is controlled, including submarine, ship and hovercraft propellers and helicopter rotors. The simplification achieved by placing the measurement, control and actuation mechanisms in the same, rotating frame of reference provides advantages for any of these applications. These advantages include mechanical simplicity, software simplicity, less complex redundancy arrangements and cost reductions.

The invention claimed is:

1. A method of controlling blade pitch angle of a set of rotor blades provided on a rotor, comprising:
   providing a target blade pitch angle to a controller mounted on the rotor;
   measuring a speed of rotation of the rotor using a rate gyro mounted on the rotor;
   calculating a blade pitch angle required to match the target blade pitch angle based on the target blade pitch angle and the measured rotational speed of the rotor; and
   actuating the blades to the calculated blade pitch angle.

2. The method as claimed in claim 1, further comprising measuring vibration of the rate gyro using a vibration transducer.

3. The method as claimed in claim 1, further comprising reducing effects of vibration by applying a filter to the measured rotational speed of the rotor.

4. The method as claimed in claim 3, wherein the filter comprises at least one of the group comprising a low pass filter, a notch filter or a fast Fourier transform.

5. The method as claimed in claim 1, further comprising applying a gain to the calculated blade pitch angle before actuating the blades.

6. A rotor blade pitch angle control arrangement for a rotor, the rotor comprising moveable rotor blades and a hub, the arrangement comprising:
   a rate gyro mounted on the rotor hub to provide a speed of rotation of the rotor;
   a blade pitch angle controller arranged to receive an input from the rate gyro comprising the speed of rotation of the rotor and an input comprising a target blade pitch angle, and arranged to output a control signal; and
   an actuation mechanism arranged to actuate the blades to a pitch angle based on the control signal.

7. The arrangement as claimed in claim 6, wherein the blade pitch angle controller is mounted on the rotor hub.

8. The arrangement as claimed in claim 6, further comprising a vibration transducer coupled to the rate gyro.

9. A propeller gas turbine engine comprising an arrangement as claimed in claim 6.

10. The propeller gas turbine engine as claimed in claim 9, wherein there are two stages of propeller rotor blades, the actuation mechanism arranged to actuate the blades of a distal stage from an engine core.

* * * * *